United States Patent
Kato

(10) Patent No.: US 12,164,289 B2
(45) Date of Patent: Dec. 10, 2024

(54) MONITORING METHOD, MONITORING APPARATUS, AND PROGRAM

(71) Applicant: NEC Corporation, Tokyo (JP)

(72) Inventor: Kiyoshi Kato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 475 days.

(21) Appl. No.: 17/436,288

(22) PCT Filed: Feb. 26, 2020

(86) PCT No.: PCT/JP2020/007822
§ 371 (c)(1),
(2) Date: Sep. 3, 2021

(87) PCT Pub. No.: WO2020/189212
PCT Pub. Date: Sep. 24, 2020

(65) Prior Publication Data
US 2022/0179407 A1 Jun. 9, 2022

(30) Foreign Application Priority Data
Mar. 19, 2019 (JP) .................. 2019-051171

(51) Int. Cl.
*G06Q 10/00* (2023.01)
*G05B 23/02* (2006.01)
*G05B 19/418* (2006.01)

(52) U.S. Cl.
CPC ...... *G05B 23/0213* (2013.01); *G05B 19/4183* (2013.01)

(58) Field of Classification Search
CPC ............................ G05B 23/0213; G06N 5/02
See application file for complete search history.

(56) References Cited

U.S. PATENT DOCUMENTS

2009/0216624 A1  8/2009  Kato

FOREIGN PATENT DOCUMENTS

JP         4872945 B     2/2012

OTHER PUBLICATIONS

International Search Report for PCT Application No. PCT/JP2020/007822, mailed on Jun. 2, 2020.

*Primary Examiner* — Lam S Nguyen

(57) ABSTRACT

A monitoring apparatus according to the present invention includes: a predicting unit configured to, based on a correlation model that corresponds to processing executed in a monitored object in accordance with a preset operation plan and represents a mutual relation between one measured value and other measured value measured from the monitored object, predict the other measured value when the one measured value is changed; and a determining unit configured to determine whether or not the predicted other measured value exceeds an allowable value set for the other measured value during the processing executed in the monitored object in accordance with the operation plan.

14 Claims, 12 Drawing Sheets

Fig.6

| ELEMENT | DEGREE OF CONTROL |
|---------|-------------------|
| a | 4 |
| b | 5 |
| c | 2 |
| d | 0 |

MONITORING METHOD, MONITORING APPARATUS, AND PROGRAM

This application is a National Stage Entry of PCT/JP2020/007822 filed on Feb. 26, 2020, which claims priority from Japanese Patent Application 2019-051171 filed on Mar. 19, 2019, the contents of all of which are incorporated herein by reference, in their entirety.

TECHNICAL FIELD

The present invention relates to a monitoring method, a monitoring apparatus, and a program.

BACKGROUND ART

In a plant such as a manufacturing factory or a processing facility, time-series data composed of the observed values of elements that can be measured from various types of sensors is analyzed, and a change in the state of the plant such as occurrence of an anomalous state or occurrence of change in a manufacturing condition is detected. The measured values of the respective elements measured in the plant are, for example, temperature, pressure, flow rate, power consumption value, supply amount of raw material, remaining amount, and so on. As a method for detecting a change in the state of the plant, there is a method of previously generating a model representing a correlation of a plurality of time-series data, checking whether or not newly observed time-series data keeps the correlation represented by the model and, when the correlation represented by the model is not kept, detecting occurrence of an anomalous state.

The model for detecting the anomaly state of a monitored object mentioned above represents a correlation between time-series data composed of measured values of a case where the monitored object is in a normal state, so that it is possible to predict, from one measured value, the other measured value. Therefore, the other measured value can be simulated by changing the one measured value, and the operation of the monitored object can be controlled.

However, in the case of using the correlation between the sensors, with respect to a measured value of one of the time-series data, a measured value of the other time-series data may exceed the allowable range of an element to be measured (for example, temperature or a CPU usage rate). Then, the other element may become a bottleneck and prevent appropriate operation control.
Patent Document 1: Japanese Patent Publication No. 4872945

Regarding the problem that an element becomes a bottleneck and prevent appropriate operation control as mentioned above, Patent Document 1 describes a technique of checking whether or not, with respect to the measured value of one of the elements, the measured value of the other element exceeds an allowable range, and specifying a bottleneck element.

However, the abovementioned technique merely specifies a bottleneck element, and has not yet determined whether or not a monitored object can be operated. For this reason, there is a risk of unnecessarily eliminating a situation that may become a bottleneck, and appropriate operation may become difficult.

SUMMARY

Accordingly, an object of the present invention is to provide a monitoring method that can settle the difficulty in appropriate operation of a monitored object.

A monitoring method according to an aspect of the present invention includes: based on a correlation model that corresponds to processing executed in a monitored object in accordance with a preset operation plan and represents a mutual relation between one measured value and other measured value measured from the monitored object, predicting the other measured value when the one measured value is changed; and determining whether or not the predicted other measured value exceeds an allowable value set for the other measured value during the processing executed in the monitored object in accordance with the operation plan.

Further, a monitoring apparatus according to an aspect of the present invention includes: a predicting unit configured to, based on a correlation model that corresponds to processing executed in a monitored object in accordance with a preset operation plan and represents a mutual relation between one measured value and other measured value measured from the monitored object, predict the other measured value when the one measured value is changed; and a determining unit configured to determine whether or not the predicted other measured value exceeds an allowable value set for the other measured value during the processing executed in the monitored object in accordance with the operation plan.

Further, a program according to an aspect of the present invention includes instructions for causing an information processing apparatus to realize: a predicting unit configured to, based on a correlation model that corresponds to processing executed in a monitored object in accordance with a preset operation plan and represents a mutual relation between one measured value and other measured value measured from the monitored object, predict the other measured value when the one measured value is changed; and a determining unit configured to determine whether or not the predicted other measured value exceeds an allowable value set for the other measured value during the processing executed in the monitored object in accordance with the operation plan.

With the configurations as described above, the present invention can aim to appropriately operate a monitored object.

BRIEF DESCRIPTION OF DRAWINGS

FIG. 6 is a view showing a state of processing by the monitoring apparatus disclosed in FIG. 1.

EXAMPLE EMBODIMENTS

First Example Embodiment

Figure 1:
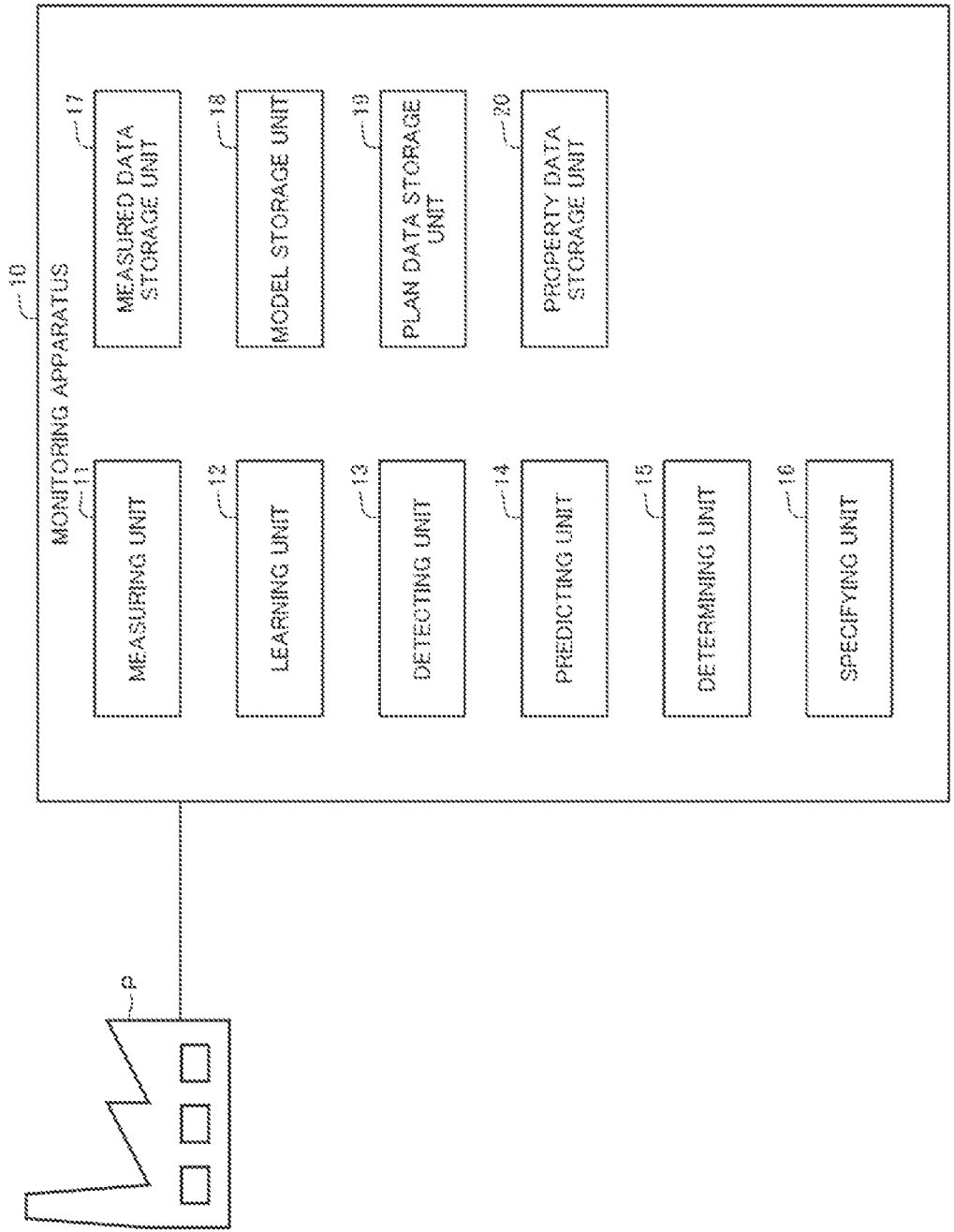
FIG. 1 is a block diagram showing a configuration of a monitoring apparatus in a first example embodiment of the present invention.

A first example embodiment of the present invention will be described with reference to FIGS. 1 to 9. FIG. 1 is a view for describing a configuration of a monitoring apparatus, and FIGS. 2 to 9 are views for describing a processing operation of the monitoring apparatus.
[Configuration]
A monitoring apparatus 10 according to the present invention is connected to a monitored object P (an object) such as a plant. The monitoring apparatus 10 is used for acquisition and analysis of the measured values of elements of the monitored object P and for monitoring of the state of the monitored object P based on the result of the analysis. For example, the monitored object P is a plant such as a manufacturing factory or a processing facility, and the measured values of the respective elements include a plurality of kinds of information such as temperature, pressure, flow rate, power consumption value, raw material supply amount, and remaining amount in the plant. In this example embodiment, the state of the monitored object P to be monitored is the anomalous state of the monitored object P, and as will be described later, the monitoring apparatus 10 performs a process to calculate the degree of anomaly from the measured values using a correlation model representing a correlation of the elements, detect the anomalous state from the degree of anomaly, and notify the anomalous state.

In this example embodiment, a plant that is the monitored object P is configured to operate in accordance with preset operation plan data (operation plan). For example, the operation plan data includes a manufacturing condition when the plant that is the monitored object P operates to manufacture a product, and date and time of operation under the manufacturing condition. Therefore, the monitored object P operates under a set manufacturing condition at set date and time. As an example, the plant that is the monitored object P is planned to operate under any of three manufacturing operation conditions A, B, and C as will be described later.

However, the monitored object P in the present invention is not limited to a plant, and may be a facility such as an information processing system, and the like. For example, in a case where the monitored object P is an information processing system, the monitoring apparatus 10 may measure the CPU (Central Processing Unit) usage rate, memory usage rate, disk access frequency, number of input/output packets, power consumption value, and so on, of an information processing apparatus configuring the information processing system, as the measured values of the respective elements, analyze the measured values to monitor the state of the information processing system.

The monitoring apparatus 10 is configured by one or a plurality of information processing apparatuses each including an arithmetic logic unit and a storage unit. As shown in FIG. 1, the monitoring apparatus 10 includes a measuring unit 11, a learning unit 12, a detecting unit 13, a predicting unit 14, a determining unit 15, and a specifying unit 16, which are structured by execution of a program by the arithmetic logic unit. The monitoring apparatus 10 also includes a measured data storage unit 17, a model storage unit 18, a plan data storage unit 19, and a property data storage unit 20, which are formed in the storage unit. The respective components will be described in detail below.

The measuring unit 11 acquires the measured values of elements measured by various types of sensors a, b, c, and d installed in the monitored object P as time-series data at given time intervals, and stores the times-series data into the measured data storage unit 17. Since there are a plurality of kinds of elements to be measured, the measuring unit 11 acquires a time-series data set that is a set of time-series data of the plurality of elements as denoted by reference symbol T in FIG. 2. The acquisition and storage of the time-series data set by the measuring unit 11 is performed at all times, and as will be described later, the acquired time-series data set is used in generating a correlation model representing a normal state of the monitored object P and in monitoring the state of the monitored object P, respectively.

Figure 2:
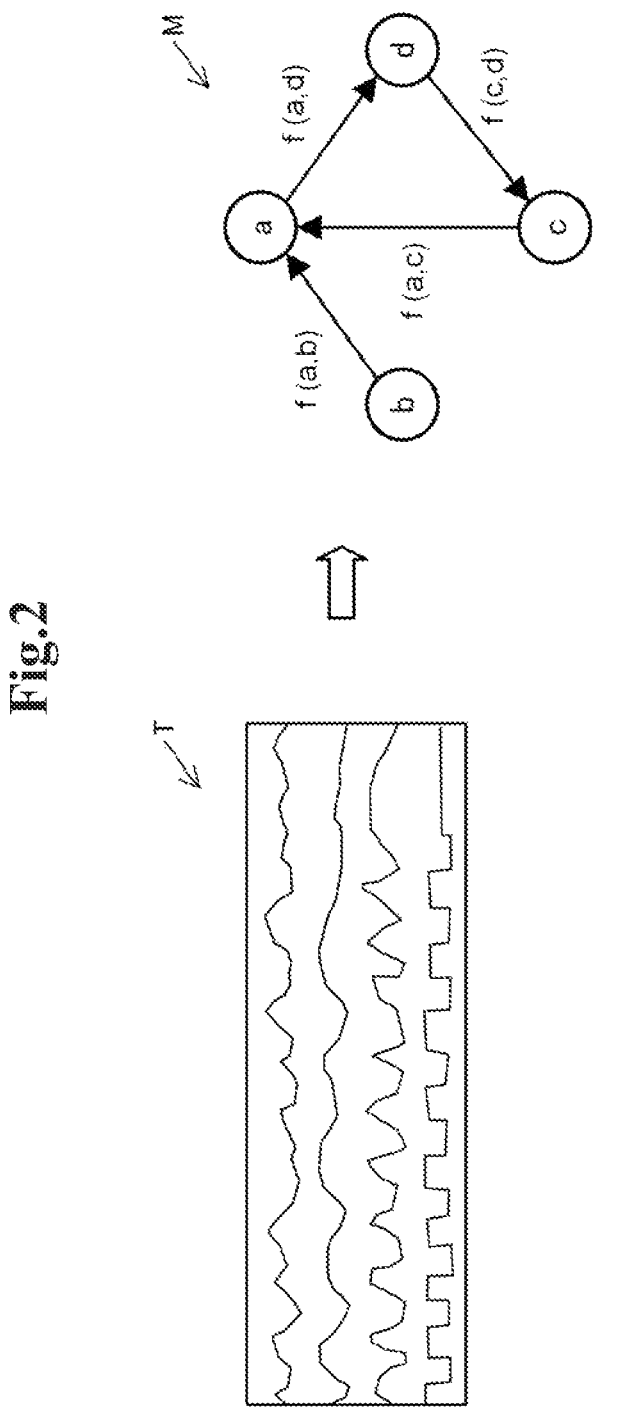
FIG. 2 is a view showing a state of processing by the monitoring apparatus disclosed in FIG. 1.

The learning unit 12 inputs a time-series data set T measured when the monitored object P is determined to be in a normal state in advance and generates a correlation model M representing a correlation between elements in the normal state as shown in FIG. 2. For example, the correlation model includes a correlation function that represents a correlation between measured values of any two elements among a plurality of elements. The correlation function is a function that predicts, with respect to an input value of one element of any two elements, an output value of the other element. At this time, a weight is set in each of the correlation functions between the elements included in the correlation model. The learning unit 12 generates a set of a plurality of correlation functions between elements as described above as the correlation model M, and stores the correlation model M into the model storage unit 18. As an example, the correlation model M shown in FIG. 2 represents that the measured value of an element a and the measured value of an element b have a correlation of a correlation function f(a, b), whereas the measured value of the element b and the measured value of an element c do not have a correlation.

In this example embodiment, the plant that is the monitored object P operates under a plurality of manufacturing conditions as mentioned above, the learning unit 12 generates correlation models each representing a normal state when the monitored object P operates under each of the manufacturing conditions. For example, the plant that is the monitored object P operates under each of the manufacturing conditions A, B, and C, and the learning unit 12 generates correlation models M when the monitored object P is in the normal state under each of the manufacturing conditions A, B, and C.

The detecting unit 13 acquires a time-series data set T measured after the abovementioned correlation model M is generated, analyzes the time-series data set T, and detects the anomalous state of the monitored object P. To be specific, the detecting unit 13 inputs a time-series data set T measured from the monitored object P, and calculates the degree of anomaly (information representing an anomalous state) representing a degree to which the monitored object P is in the anomalous state, using the correlation model M stored in the model storage unit 18. At this time, the detecting unit 13 refers to operation plan data of the plant that is the monitored object P, specifies an operation status (operation) of the monitored object P, and calculates the degree of anomaly using a correlation model M corresponding to the specified operations status. For example, in the case of specifying that the monitored object P is operating under the "manufacturing condition B", the detecting unit 13 sets a correlation model M corresponding to the "manufacturing condition B". The abovementioned operation plan data is stored in the plan data storage unit 19. The operation plan data is, for example, as shown in the upper part of FIG. 3, data representing a plan of operating in order of the manufacturing conditions A, B, and C two days for each as a phase 1.

Then, using the correlation model M set correspondingly to the operation condition of the monitored object P, the detecting unit 13 inputs a measured value of one element (a first element) of given two elements as an input value into a correlation function between the two elements, predicts an output value of the other element (a second element), and checks a difference between the predicted value and an actually measured value. When the difference is equal to or more than a predetermined value, the detecting unit 13 detects a correlation breakdown in the correlation between the two elements. The detecting unit 13 checks the differences in the plurality of correlation functions between the elements and the status of the correlation breakdown, and calculates the degree of anomaly according to the magnitude of the difference, the weight in the correlation function, the number of correlation breakdowns, and so on. For example, as the degree of correlation breakdown is higher, the detecting unit 13 regards the degree of the anomalous state of the monitored object P as higher, and calculates the value of the degree of anomaly to be higher. Then, the detecting unit 13 calculates the degree of anomaly with respect to each time of the time-series data set, and detects that the monitored object P has come into the anomalous state when the degree of anomaly is equal to or more than a threshold value. However, a method for detecting the anomalous state by the detecting unit 13 is not limited to the abovementioned method, and may be any method.

Figure 3:
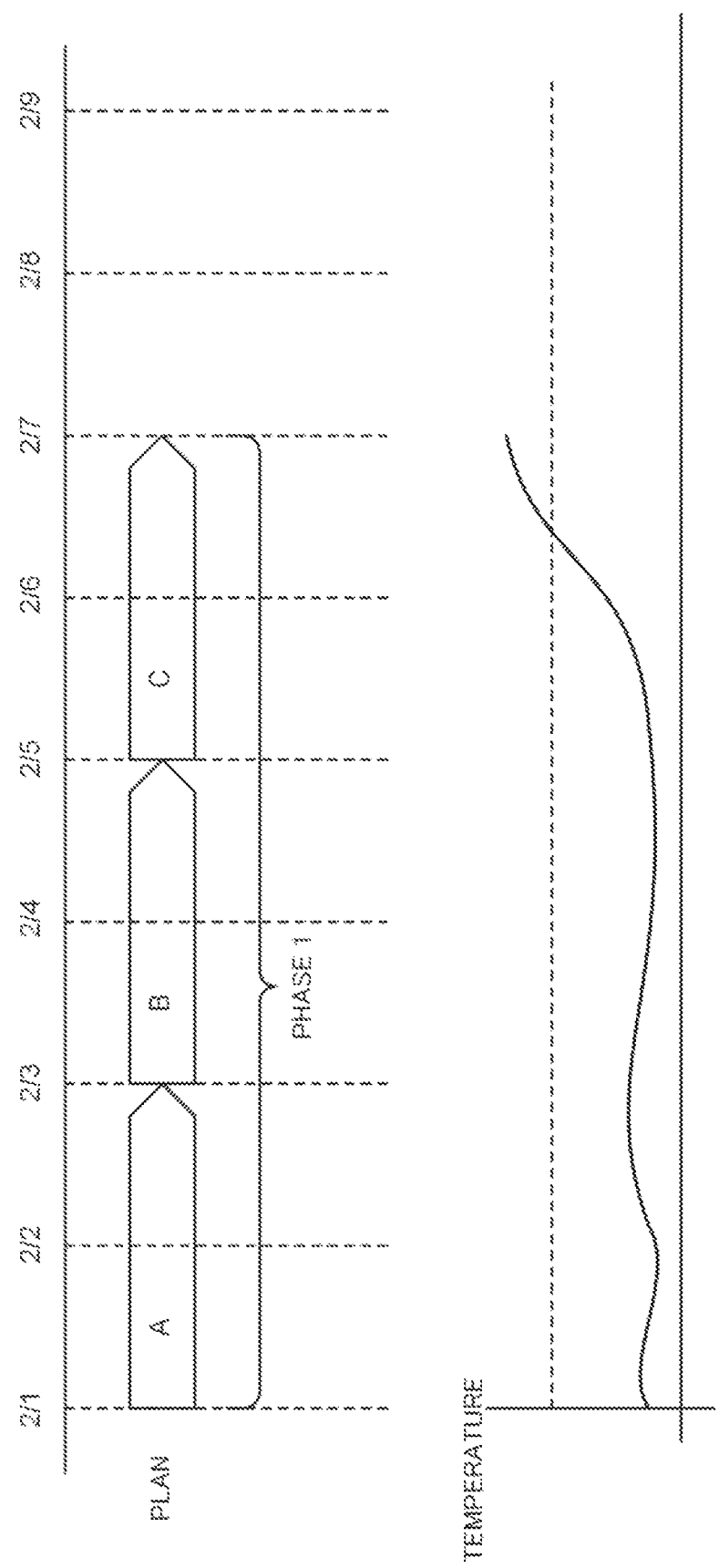
FIG. 3 is a view showing a state of processing by the monitoring apparatus disclosed in FIG. 1.
Figure 4:
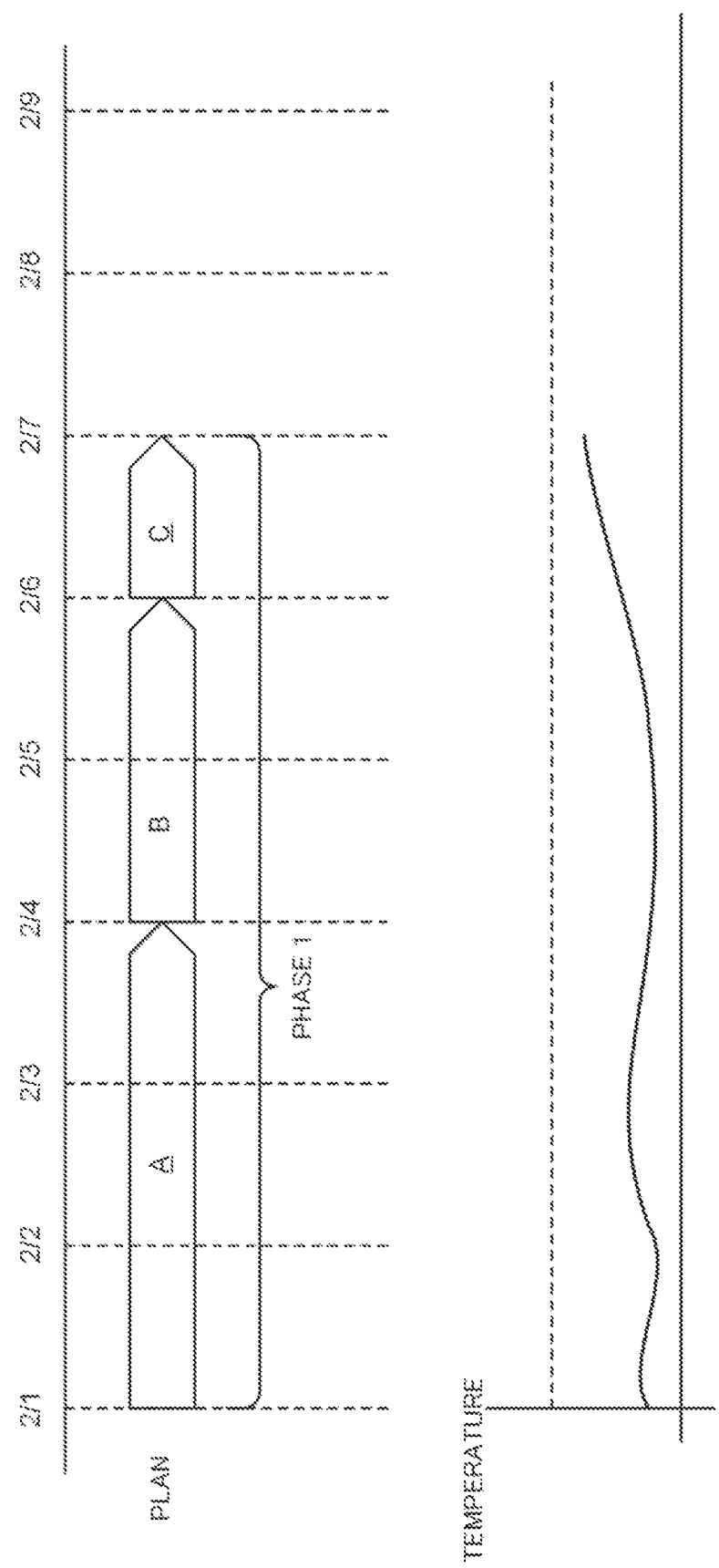
FIG. 4 is a view showing a state of processing by the monitoring apparatus disclosed in FIG. 1.
Figure 5:
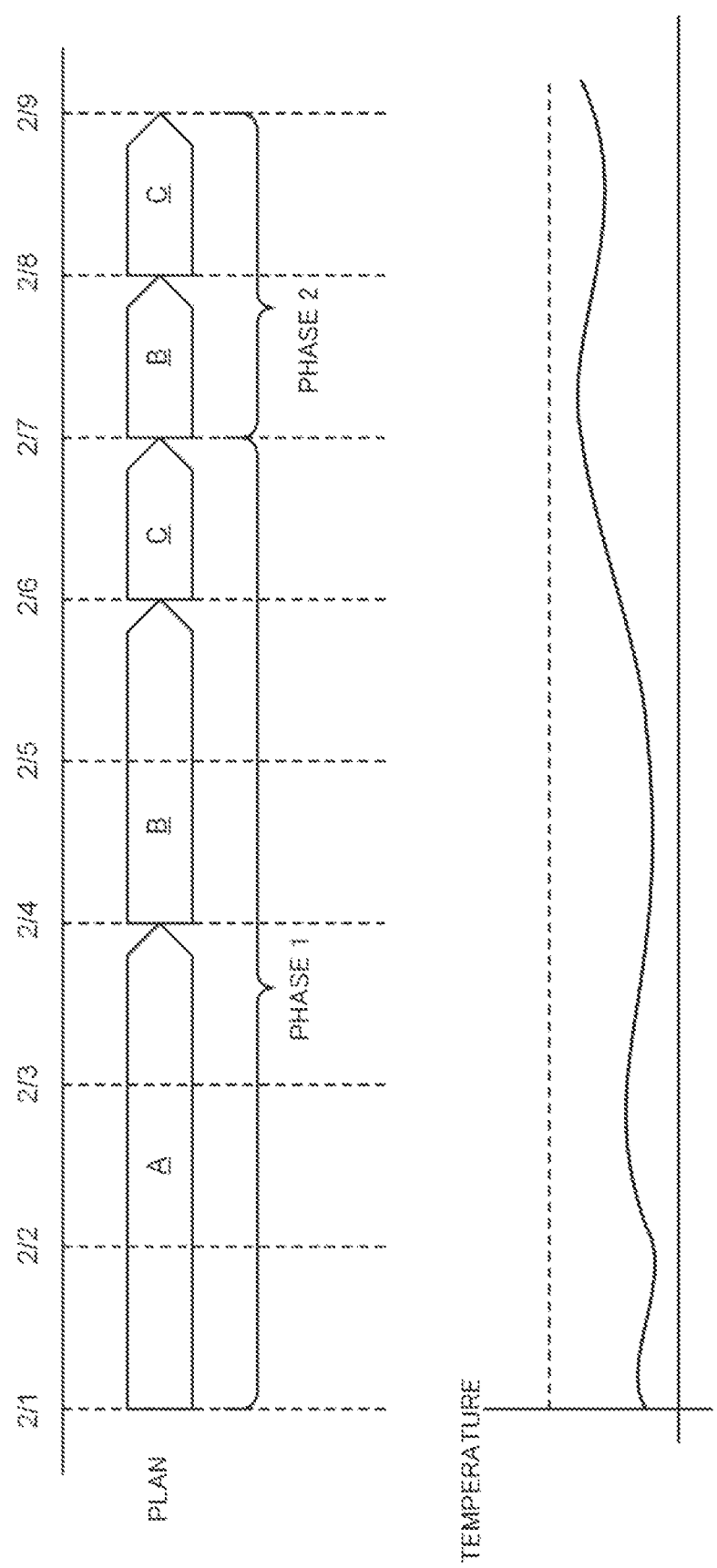
FIG. 5 is a view showing a state of processing by the monitoring apparatus disclosed in FIG. 1.
Figure 7:
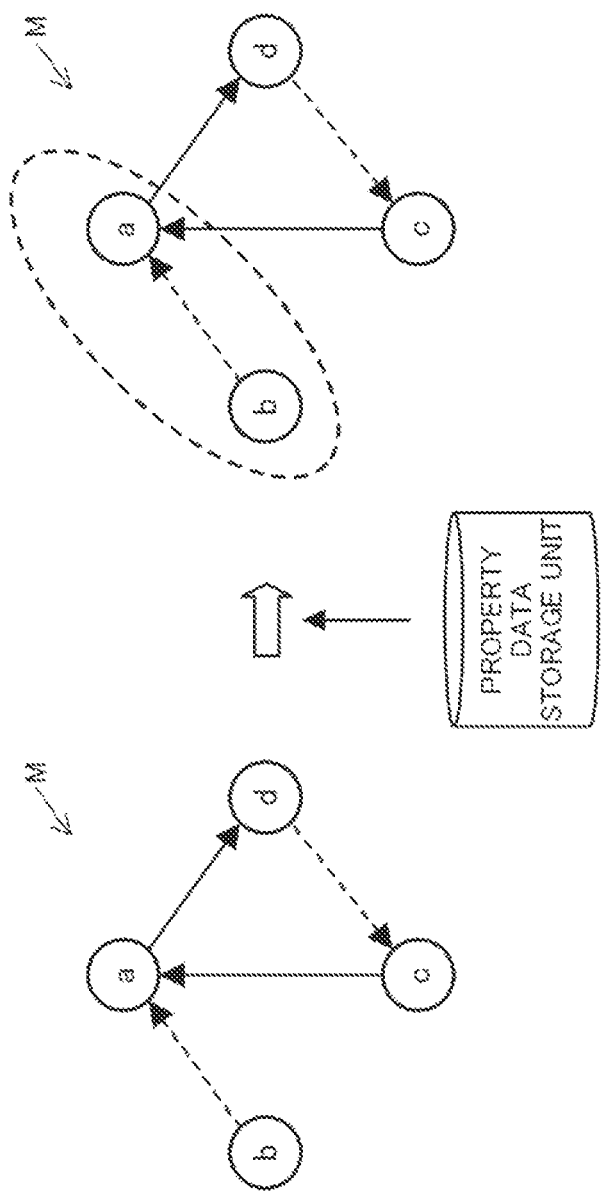
FIG. 7 is a view showing a state of processing by the monitoring apparatus disclosed in FIG. 1.

Using the abovementioned correlation model M, the predicting unit 14 inputs a measured value of one element of given two elements into a correlation function between the two elements while changing the measured value, and predicts a measured value of the other element at that time. That is to say, using the correlation model M, the predicting unit 14 simulates, from the measured value of the one element, the measured value of the other element. At this time, since the plant that is the monitored object P operates according to the abovementioned operation plan data, the operating status, that is, the manufacturing condition of the monitored object P changes with the change of time. At the same time, the predicting unit 14 predicts the measured value of the element using the correlation model M corresponding to the operation status, that is, the manufacturing condition according to the operation plan data. For example, the upper view of FIG. 3 shows the phase 1 of the operation plan data, and the operation status of the monitored object P changes in order of manufacturing conditions A, B, and C. Therefore, in response to this, the predicting unit 14 changes the correlation model M used for prediction to a correlation model M corresponding to each of the manufacturing conditions A, B, and C. Then, as shown in the lower view of FIG. 3, using the correlation model M set correspondingly to each of the manufacturing conditions A, B, and C, the predicting unit 14 predicts a change in "temperature" that is the value of the other element of certain elements when the value of one element is changed. The value of the one element input into the correlation model M may be, for example, changed within a range that can be taken at each time, or changed within a range that can be taken according to the manufacturing condition or the passage of time.

Further, when the determining unit 15 changes or adds the operation plan data as will be described later, the predicting unit 14 predicts, from the value of the one element, the value of the other element by using the correlation model M in the same manner as described above according to the changed or added operation plan data.

The determining unit 15 determines whether or not the measured value of an element predicted while the monitored object P is operating according to the operation plan data as described above exceeds an allowable value set correspondingly to the element. For example, it is assumed that in a case where the value of an element to be predicted is "temperature", an allowable value shown by a dotted line in the lower view of FIG. 3 is set. In this case, the determining unit 15 determines that while the monitored object P is operating according to the phase 1 of the operation plan data in the upper view of FIG. 3, "temperature" that is the value of an element to be predicted exceeds the allowable value on February 6 while the monitored object P is operating under the "manufacturing condition C" as shown in the lower view of FIG. 3.

In this case, the determining unit 15 (a plan changing unit) determines that "temperature" that is a predicted element value becomes a bottleneck, and changes operation plan data representing a plan of the operation status of the monitored object P so that "temperature" that is the element value does not exceed the allowable value. For example, since "temperature" that is a predicted element value exceeds the allowable value under the "manufacturing condition" C, the determining unit 15 changes the operation plan data so as to shorten an operation time under the "manufacturing condition C". As an example, the determining unit 15 changes to a plan that in the phase 1, the monitored object P operates under the "manufacturing condition A" for an operation time of three days extended from two days, then operates under the "manufacturing condition B" for two days as in the initial plan, and then operates under the "manufacturing condition C" for one day shortened from two days as shown in the upper view of FIG. 4, and stores the changed operation plan data into the plan data storage unit 19.

When the operation plan data is changed in the abovementioned manner, the predicting unit 14 again predicts the value of the element using the correlation model M in the same manner as described above in accordance with the changed operation plan data. Then, the determining unit 15 determines whether or not a predicted value of the value of the element thus predicted in accordance with the changed operation plan data exceeds an allowable value set correspondingly to the element. For example, the determining unit 15 determines that while the monitored object P is operating in accordance with the phase 1 of the changed operation plan data shown in the upper view of FIG. 4, "temperature" that is a predicted element value does not exceed the allowable value as shown in the lower view of FIG. 4.

Furthermore, the determining unit 15 may add a plan to the abovementioned operation plan data. For example, in a case where the operation plan data is changed as described above and consequently "temperature" that is a predicted element value does not exceed an allowable value, the determining unit 15 adds a plan to complement the change in the operation plan data. For example, as a result of the change in the operation plan data mentioned above, the operation time under the "manufacturing condition C" is shortened as compared with the initial plan. Therefore, the determining unit 15 intends to add the operation time under the "manufacturing condition C", but "temperature" may exceed the allowable value when the monitored object P operates under the "manufacturing condition C" continuously for two days as shown in FIG. 3. For this reason, the determining unit 15 plans a "phase 2" including after operation under the "manufacturing condition C" at the end of the "phase 1", operation under the "manufacturing condition B" for one day and then operation under the "manufacturing condition C" for one day, and adds the "phase 2" to the operation plan data as shown in the upper view of FIG. 5.

When the operation plan data is added as described above, the predicting unit 14 again predicts the value of an element using the correlation model M in accordance with the added operation plan data in the same manner as described above. Then, the determining unit 15 determines whether or not a predicted value of the value of the element predicted in accordance with the added operation plan data exceeds an allowable value set correspondingly to the element. For example, the determining unit 15 determines that while the monitored object P is operating in accordance with the "phase 2" of the added operation plan data shown in the upper view of FIG. 5, "temperature" that is a predicted element value does not exceed the allowable value as shown in the lower view of FIG. 5.

Figure 6:
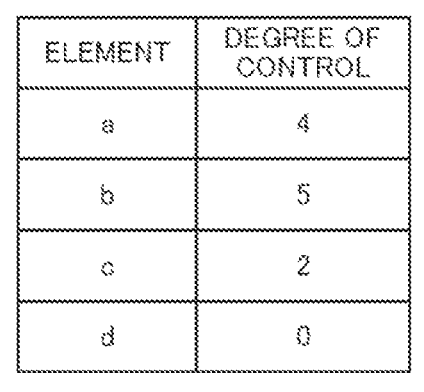

The specifying unit 16 specifies, when the value of the element predicted by the determining unit 15 described above exceeds the allowable value, the one element input into the correlation model M at the time of prediction. At this time, the specifying unit 16 specifies the element based on property data representing properties of elements stored in the property data storage unit 20. The property data is, for example, as shown in FIG. 6, a degree of control that indicates the degree of controllability of each of the elements measured by the respective sensors. The degree of control represents that it is easier to control as its numerical value is larger. For example, the element d has a degree of control of "0", representing that it cannot be controlled like the temperature and humidity of the air. The element b has a degree of control of "5", which is a higher value than the others, representing that an operator can easily change the setting and easily control. The degree of control is not limited to the abovementioned values, and may simply be a value representing whether or not it is controllable. For example, by distinguishing the temperature of the outside air that is difficult to control, the temperature of a pipe that can be controlled by construction, and the temperature of a pipe that can be easily controlled by an installed heater with binary or multi-valued numerical values, degrees of control may be expressed.

Then, the specifying unit 16 specifies, for example, an element whose degree of control is the highest based on the property data. It is assumed that the value of an element predicted between elements connected by a dotted-line arrow exceeds an allowable value in the correlation model M shown in FIG. 7. In the example shown in FIG. 7, it is assumed that the values of predicted elements between the element b and the element a and between the element d and the element c exceed allowable values. At this time, input elements are the element b and the element d, and the specifying unit 16 specifies the element b whose degree of control is higher, and also specify a correlation including the element b (see a dotted ellipse).

Meanwhile, the specifying unit 16 is not necessarily limited to specifying an element by the abovementioned method. For example, the specifying unit 16 is not necessarily limited to specifying an element based on degrees of control, and may specify an element using property data representing another property of the elements. As an example, the property data may be the degree of necessity of elements in the monitored object P, the degree of influence of elements on the monitored object P, or the like.

In the above description, a measured value by one sensor is a value obtained by measuring a state arising from one element. For example, in a case where a measured value by a "sensor" is "temperature", an "element" is a value obtained by measuring "temperature in plant". However, according to the present invention, a measured value by one sensor may be a value obtained by measuring a state arising from a plurality of generation sources (elements). For example, in a case where a measured value by a "sensor" is "frequency", the "frequency" may be a value obtained by measuring "frequency" including a "frequency component of vibrations of a machine that is a generation source" and a "frequency component of vibrations due to an earthquake that is a generation source". In this case, the specifying unit 16 extracts the respective component values from the measured value of the element, and specifies generation sources causing the component values from the properties of the component values. Then, the specifying unit 16 may further specify a generation source finally from the specified generation sources. In this case, as in the case of property data representing the property of an element, data representing a property such as the degree of control of a generation source may be previously stored, and a generation source may be specified based on the data.

[Operation]

Figure 8:
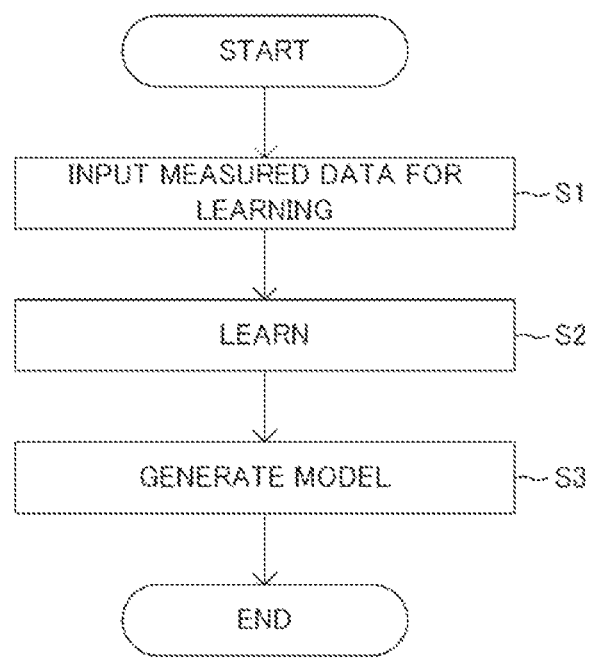
FIG. 8 is a flowchart showing an operation of the monitoring apparatus disclosed in FIG. 1.
Figure 9:
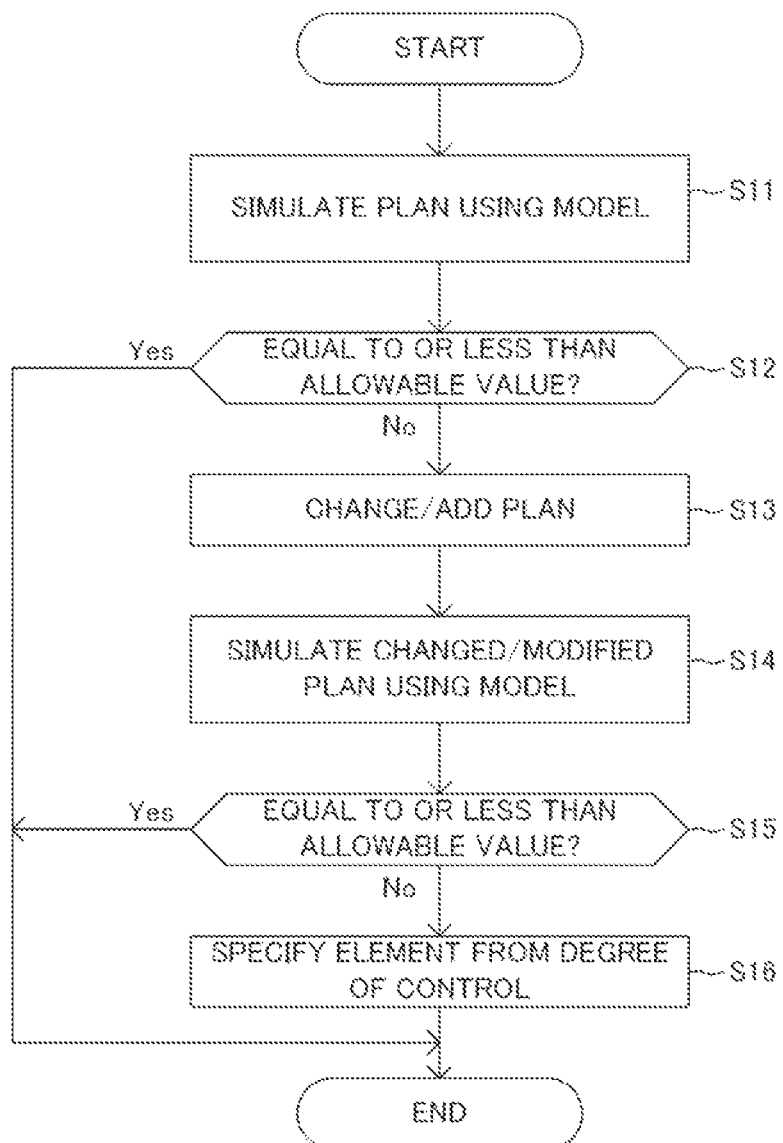
FIG. 9 is a flowchart showing an operation of the monitoring apparatus disclosed in FIG. 1.

Next, an operation of the above monitoring apparatus 10 will be described majorly with reference to flowcharts of FIGS. 8 to 9. First, with reference to the flowchart of FIG. 8, an operation when generating a correlation model representing a correlation between elements in a case where the monitored object P is in the normal state will be described.

The monitoring apparatus 10 first retrieves and inputs data for learning, which is a time-series data set measured when the monitored object P is operating under an operation condition A and the monitored object P is determined to be in the normal state, from the measured data storage unit 17 (step S1). Then, the monitoring apparatus 10 learns a correlation between elements from the input time-series data (step S2), and generates a correlation model representing the correlation between the elements (step S3). Then, the monitoring apparatus 10 stores the generated correlation model as a correlation model representing the normal state when the monitored object P is operating under the operation condition A, into the model storage unit 18. The monitoring apparatus 10 thus generates a correlation model representing the normal state when the monitored object P is operating under an operation condition B, a correlation model representing the normal state when the monitored object P is operating under an operation condition C, and if necessary, a correlation model when the monitored object P is operating under another operation condition, and stores the correlation models into the model storage unit 18.

Next, with reference to the flowchart of FIG. 9, an operation when predicting a measured value that can be measured from each sensor in accordance with operation plan data will be described. It is assumed that, as the operation plan data, first, a "phase 1" shown in the upper part of FIG. 3 is previously stored.

First, the monitoring apparatus 10 acquires operation plan data from the plan data storage unit 19, and checks the operation status of the monitored object P. Then, the monitoring apparatus 10 predicts a measured value measured by each of sensor using a correlation model M corresponding to the operation status, that is, a manufacturing condition corresponding to the operation plan data. For example, since the operation status of the monitored object P changes with the passage of time in order of the manufacturing conditions A, B, and C, the monitoring apparatus 10 changes the correlation model M used for prediction to a model corresponding to each of the manufacturing conditions A, B, and C according to the change of the manufacturing condition. Then, as shown in the lower view of FIG. 3, using the correlation Model M set correspondingly to each of the manufacturing conditions A, B, and C, the monitoring apparatus 10 predicts, from a correlation function between one element and the other element, a change in "temperature" that is the value of the other element when the one element is changed (step S11).

Subsequently, the monitoring apparatus 10 determines whether or not a measured value of an element predicted while the monitored object P is operating in accordance with the operation plan data exceeds an allowable value set correspondingly to the element (step S12). At this time, when determining that "temperature" that is the value of an element to be predicted exceeds an allowable value on "February 6" while the monitored object P is operating under the "manufacturing condition C", for example, as shown in the lower view of FIG. 3 (Step S12, No), the monitoring apparatus 10 changes the operation plan data (step S13). Herein, it is assumed that the monitoring apparatus 10 changes to a plan to first operate under the "manufacturing condition A" for three days, then operate under the "manufacturing condition B" for two days as planned, and then operate under the "manufacturing condition C" for only one day, initially for two days, in the phase 1 as shown in the upper view of FIG. 4.

Subsequently, upon changing the operation plan data, the monitoring apparatus 10 again predicts the value of an element using the correlation model M in the same manner as described above in accordance with the changed operation plan data (step S14). Then, the monitoring apparatus 10 determines whether or not a predicted value of the value of the element predicted in accordance with the changed operation plan data exceeds an allowable value set correspondingly to the element (step S15). For example, in the case of the lower view of FIG. 4, the monitoring apparatus 10 determines that "temperature" that is the value of an element to be predicted does not exceed the allowable value (step S15, Yes).

Meanwhile, the monitoring apparatus 10 may further add a plan to the operation plan data (step S13). For example, as described above, the monitoring apparatus 10 may add a plan for complementing the change in the operation plan data in response to the result of changing the operation plan data. For example, as shown in the upper part of FIG. 5, the monitoring apparatus 10 may add a "phase 2" of a plan to operate under the "manufacturing condition B" and the "manufacturing condition C" one day for each to the operation data. In this case, the monitoring apparatus 10 again predicts the value of an element in accordance with the added operation plan data in the same manner as described above (step S14), and determines whether the predicted value of the element does not exceed the allowable value (step S15).

Further, in a case where the predicted value of the element exceeds the allowable value and the monitoring apparatus 10 does not change the operation plan data (step S15, No), the monitoring apparatus 10 specifies one element input into the correlation model M at the time of prediction (step S16). At this time, the monitoring apparatus 10 specifies the element based on property data representing properties such as the degrees of control of elements. Then, the monitoring apparatus 10 outputs the specified element to a monitoring person or the like.

Thus, according to the present invention, based on a correlation model representing a mutual relation between one measured value and the other measured value in the monitored object P, the other measured value when the one measured value is changed is predicted, and it is determined whether or not a predicted measured value exceeds an allowable value when processing is executed in accordance with an operation plan. Therefore, it can be determined whether or not an element which is a measured object of the other measured value in an actual operation plan becomes a bottleneck. As a result, it is possible to easily take measures such as changing a control value with reference to the determination result, the need for excessively taking safety measures is eliminated, and the monitored object P can be appropriately operated.

Further, according to the present invention, an operation plan of the monitored object P is changed in accordance with prediction of a measured value. With this, it is possible to easily take measures such as modifying part of the operation plan, the need for excessively taking safety measures is eliminated, and the monitored object P can be appropriately operated.

Furthermore, according to the present invention, an element is specified according to the property of the element from among input elements that are the factors of elements to be a bottleneck. With this, it is possible to take measures to specified element and it is possible to appropriately operate a monitored object.

Second Example Embodiment

Figure 10:
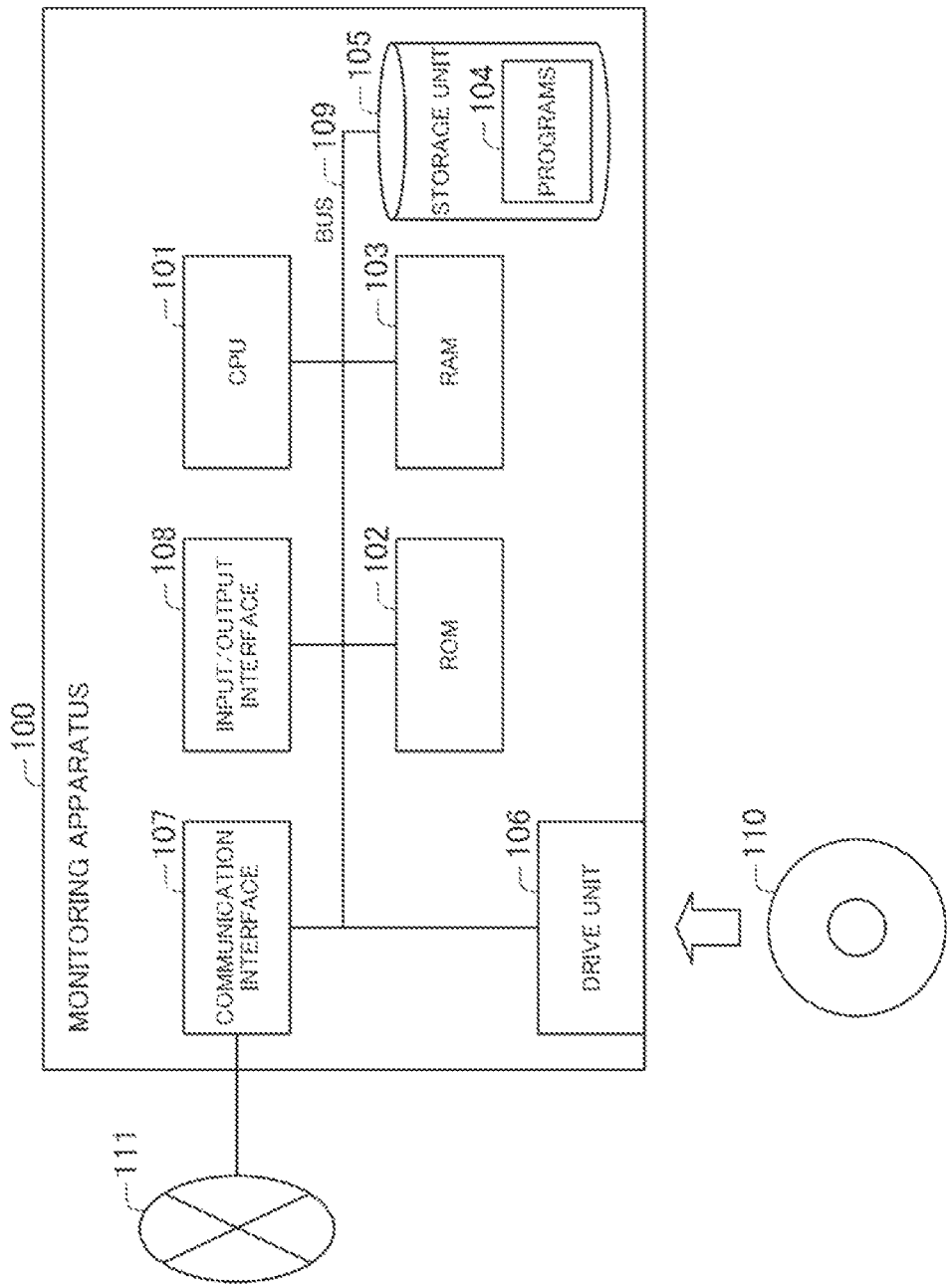
FIG. 10 is a block diagram showing a hardware configuration of a monitoring apparatus in a second example embodiment of the present invention.
Figure 11:
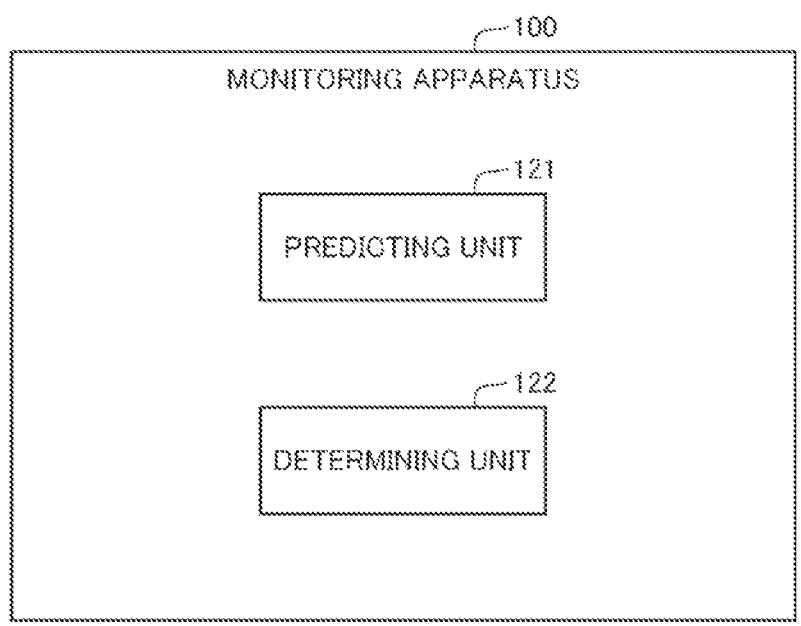
FIG. 11 is a block diagram showing a configuration of the monitoring apparatus in the second example embodiment of the present invention.
Figure 12:
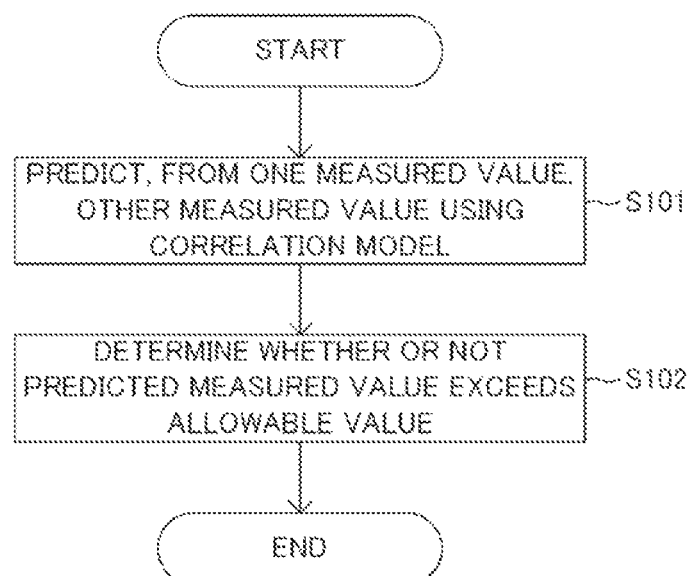
FIG. 12 is a flowchart showing an operation of the monitoring apparatus in the second example embodiment of the present invention.

Next, a second example embodiment of the present invention will be described with reference to FIGS. 10 to 12. FIGS. 10 to 11 are block diagrams showing a configuration of a monitoring apparatus in the second example embodiment, and FIG. 12 is a flowchart showing an operation of the monitoring apparatus. In this example embodiment, the overview of the configurations of the monitoring apparatus and the processing method by the monitoring apparatus described in the first example embodiment is illustrated.

First, with reference to FIG. 10, a hardware configuration of a monitoring apparatus 100 in this example embodiment will be described. The monitoring apparatus 100 is configured by a general information processing apparatus, and as an example, includes the following hardware configuration;

a CPU (Central Processing Unit) 101 (arithmetic logic unit), a ROM (Read Only Memory) 102 (storage unit), a RAM (Random Access Memory) 103 (storage unit), programs 104 loaded to the RAM 103, a storage unit 105 for storing the programs 104, a drive unit 106 that reads from and writes into a storage medium 110 outside the information processing apparatus, a communication interface 107 connecting to a communication network 111 outside the information processing apparatus, an input/output interface 108 performing input/output of data, and a bus 109 connecting the respective components.

Then, the monitoring apparatus 100 can structure and install a predicting unit 121 and a determining unit 122 shown in FIG. 11 therein by the CPU 101 acquiring and executing the programs 104. The programs 104 are, for example, previously stored in the storage unit 105 or the ROM 102, and loaded into the RAM 103 and executed by the CPU 101 as necessary. The programs 104 may be supplied to the CPU 101 via the communication network 111, or may be previously stored in the recording medium 110 and retrieved and supplied to the CPU 101 by the drive unit 106. However, the predicting unit 121 and the determining unit 122 mentioned above may be structured by an electronic circuit.

FIG. 10 shows an example of the hardware configuration of the information processing apparatus that is the monitoring apparatus 100, and the hardware configuration of the information processing apparatus is not illustrated in the abovementioned case. For example, the information processing apparatus may be configured by part of the abovementioned configuration, for example, without the drive unit 106.

Then, the monitoring apparatus 100 executes a monitoring method shown in the flowchart of FIG. 12 by the functions of the predicting unit 121 and the determining unit 122 structured by the programs as described above.

As shown in FIG. 12, the monitoring apparatus 100:

based on a correlation model that corresponds to processing executed in a monitored object in accordance with a preset operation plan and represents a mutual relation between one measured value and other measured value measured from the monitored object, predicts the other measured value when the one measured value is changed (step S101); and determines whether or not the predicted other measured value exceeds an allowable value set for the other measured value during the processing executed in the monitored object in accordance with the operation plan (step 102).

According to the present invention, with the configuration as described above, based on a correlation model that represents a mutual relation between one measured value and other measured value in a monitored object, the other measured value when the one measured value is changed is predicted, and it is determined whether or not the predicted measured value exceeds an allowable value when processing is executed in accordance with an operation plan. Accordingly, it is possible to determine whether or not an element to be measured of the other measured value becomes a bottleneck in an actual operation plan, and it is possible to appropriately operate the monitored object with reference to the determination result.

The abovementioned program can be stored in various types of non-transitory computer-readable mediums and supplied to a computer. The non-transitory computer-readable mediums include various types of tangible storage mediums. The non-transitory computer-readable mediums include, for example, a magnetic recording medium (for example, a flexible disk, a magnetic tape, a hard disk drive), an optical magnetic recording medium (for example, a magnetooptical disk), a CD-ROM (Read Only Memory), a CD-R, a CD-R/W, and a semiconductor memory (for example, a mask ROM, a PROM (Programmable ROM), an EPROM (Erasable PROM), a flash ROM, a RAM (Random Access Memory)). Moreover, the program may be supplied to a computer by various types of transitory computer-readable mediums. The transitory computer-readable mediums include, for example, an electric signal, an optical signal, and an electromagnetic wave. The transitory computer-readable mediums can supply the program to a computer via a wired communication path such as an electric wire and an optical fiber or a wireless communication path.

Although the present invention has been described above with reference to the example embodiments and so on, the present invention is not limited to the above example embodiments. The configurations and details of the present invention can be changed in various manners that can be understood by one skilled in the art within the scope of the present invention.

The present invention is based upon and claims the benefit of priority from Japanese patent application No. 2019-051171, filed on Mar. 19, 2019, the disclosure of which is incorporated herein in its entirety by reference.

<Supplementary Notes>

The whole or part of the example embodiments disclosed above can be described as the following supplementary notes. Below, the overview of the configurations of a monitoring method, a monitoring apparatus, and a program according to the present invention will be described. However, the present invention is not limited to the following configurations.

(Supplementary Note 1)

A monitoring method comprising:

based on a correlation model that corresponds to processing executed in a monitored object in accordance with a preset operation plan and represents a mutual relation between one measured value and other measured value measured from the monitored object, predicting the other measured value when the one measured value is changed; and determining whether or not the predicted other measured value exceeds an allowable value set for the other measured value during the processing executed in the monitored object in accordance with the operation plan.

(Supplementary Note 2)

The monitoring method according to Supplementary Note 1, comprising changing the operation plan in accordance with a result of determining on the predicted other measured value.

(Supplementary Note 3)

The monitoring method according to Supplementary Note 1 or 2, comprising:

in a case where the operation plan is changed, predicting the other measured value when the one measured value is changed based on the correlation model that corresponds to processing executed in accordance with the changed operation plan; and determining whether or not the predicted other measured value exceeds the allowable value set for the other measured value during the processing executed in the monitored object in accordance with the changed operation plan.

(Supplementary Note 4)

The monitoring method according to any of Supplementary Notes 1 to 3, comprising:

in a case where the operation plan is changed and processing for the monitored object is thereby added to the operation plan, predicting the other measured value when the one measured value is changed based on the correlation model that corresponds to the added processing; and determining whether or not the predicted other measured value exceeds the allowable value set for the other measured value during the processing added to the operation plan by changing the operation plan in the monitored object.

(Supplementary Note 5)

The monitoring method according to any of Supplementary Notes 1 to 4, comprising, from among elements causing the one measured value when the predicted other measured value exceeds the allowable value set for the other predicted value, specifying the element based on preset properties of the elements.

(Supplementary Note 6)

The monitoring method according to Supplementary Note 5, comprising specifying the element based on controllability of the elements representing the properties of the elements.

(Supplementary Note 7)

A monitoring apparatus comprising:

a predicting unit configured to, based on a correlation model that corresponds to processing executed in a monitored object in accordance with a preset operation plan and represents a mutual relation between one measured value and other measured value measured from the monitored object, predict the other measured value when the one measured value is changed; and a determining unit configured to determine whether or not the predicted other measured value exceeds an allowable value set for the other measured value during the processing executed in the monitored object in accordance with the operation plan.

(Supplementary Note 8)

The monitoring apparatus according to Supplementary Note 8, comprising a plan changing unit configured to change the operation plan in accordance with a result of determining on the predicted other measured value.

(Supplementary Note 9)

The monitoring apparatus according to Supplementary Note 7 or 8, wherein:

the predicting unit is configured to, in a case where the operation plan is changed, predict the other measured value when the one measured value is changed based on the correlation model that corresponds to processing executed in accordance with the changed operation plan; and the determining unit is configured to determine whether or not the predicted other measured value exceeds the allowable value set for the other measured value during the processing executed in the monitored object in accordance with the changed operation plan.

(Supplementary Note 10)

The monitoring apparatus according to any of Supplementary Notes 7 to 9, wherein:

the predicting unit is configured to, in a case where the operation plan is changed and processing for the monitored object is thereby added to the operation plan, predict the other measured value when the one measured value is changed based on the correlation model that corresponds to the added processing; and the determining unit is configured to determine whether or not the predicted other measured value exceeds the allowable value set for the other measured value during the processing added to the operation plan by changing the operation plan in the monitored object.

(Supplementary Note 11)

The monitoring apparatus according to any of Supplementary Notes 7 to 10, comprising a specifying unit configured to, from among elements causing the one measured value when the predicted other measured value exceeds the allowable value set for the other predicted value, specify the element based on preset properties of the elements.

(Supplementary Note 12)

A program comprising instructions for causing an information processing apparatus to realize:

a predicting unit configured to, based on a correlation model that corresponds to processing executed in a monitored object in accordance with a preset operation plan and represents a mutual relation between one measured value and other measured value measured from the monitored object, predict the other measured value when the one measured value is changed; and a determining unit configured to determine whether or not the predicted other measured value exceeds an allowable value set for the other measured value during the processing executed in the monitored object in accordance with the operation plan.

(Supplementary Note 13)

The program according to Supplementary Note 12, comprising instructions for causing the information processing apparatus to further realize a plan changing unit configured to change the operation plan in accordance with a result of determining on the predicted other measured value.

(Supplementary Note 14)

The program according to Supplementary Note 12 or 13, comprising instructions for causing the information processing apparatus to further realize a specifying unit configured to, from among elements causing the one measured value when the predicted other measured value exceeds the allowable value set for the other predicted value, specify the element based on preset properties of the elements.

DESCRIPTION OF NUMERALS 10 monitoring apparatus
11 measuring unit
12 learning unit
13 detecting unit
14 predicting unit
15 determining unit
16 specifying unit
17 measured data storage unit
18 model storage unit
19 plan data storage unit
20 property data storage unit
P monitored object
100 monitoring apparatus
101 CPU
102 ROM
103 RAM
104 programs
105 storage unit
106 drive unit
107 communication interface
108 input/output interface
109 bus
110 storage medium
111 communication network
121 predicting unit
122 determining unit

What is claimed is:

1. A monitoring method performed by a computer and comprising:

based on a correlation model that corresponds to processing executed in a monitored object in accordance with an operation plan in which an operation condition and an operation date/time of the operation condition are set and that represents a mutual relation between a first measured value and a second measured value measured from the monitored object, predicting the second measured value when the first measured value is changed;

determining whether or not the predicted second measured value exceeds an allowable value set for the second measured value during the processing executed in the monitored object in accordance with the operation plan; and changing the operation plan in which the operation condition and the operation date/time of the operation condition are set, in accordance with a result of determining whether or not the predicted second measured value exceeds the allowable value.

2. The monitoring method according to claim 1, comprising:
in a case where the operation plan is changed, predicting the second measured value when the first measured value is changed based on the correlation model that corresponds to processing executed in accordance with the changed operation plan; and
determining whether or not the predicted second measured value exceeds the allowable value set for the second measured value during the processing executed in the monitored object in accordance with the changed operation plan.

3. The monitoring method according to claim 1, comprising:
in a case where the operation plan is changed and processing for the monitored object is thereby added to the operation plan, predicting the second measured value when the first measured value is changed based on the correlation model that corresponds to the added processing; and
determining whether or not the predicted second measured value exceeds the allowable value set for the second measured value during the processing added to the operation plan by changing the operation plan in the monitored object.

4. The monitoring method according to claim 1, further comprising, from among elements for the first measured value when the predicted second measured value exceeds the allowable value set for the second predicted value, specifying the element based on preset properties of the elements.

5. The monitoring method according to claim 4, comprising specifying the element based on controllability of the elements representing the properties of the elements.

6. The monitoring method according to claim 1, wherein changing the operation plan includes making a change regarding a particular operation condition under which the processing has been executed when the predicted second measured value has exceeded the allowable value.

7. The monitoring method according to claim 1, wherein changing the operation plan includes making a change to an operation date/time of a particular operation condition under which the processing has been executed when the predicted second measured value has exceeded the allowable value.

8. The monitoring method according to claim 7, wherein changing the operation plan includes making a change to an operation date/time of another operation condition in accordance with the change made to the operation date/time of the particular operation condition.

9. A monitoring apparatus comprising:
at least one memory storing instructions; and
at least one processor configured to execute instructions to:
based on a correlation model that corresponds to processing executed in a monitored object in accordance with an operation plan in which an operation condition and an operation date/time of the operation condition are set and that represents a mutual relation between a first measured value and a second measured value measured from the monitored object, predict the second measured value when the first measured value is changed;

determine whether or not the predicted second measured value exceeds an allowable value set for the second measured value during the processing executed in the monitored object in accordance with the operation plan; and change the operation plan in which the operation condition and the operation date/time of the operation condition are set, in accordance with a result of determining whether or not the predicted second measured value exceeds the allowable value.

10. The monitoring apparatus according to claim 9, wherein the at least one processor is configured to execute the instructions to:
in a case where the operation plan is changed, predict the second measured value when the first measured value is changed based on the correlation model that corresponds to processing executed in accordance with the changed operation plan; and
determine whether or not the predicted second measured value exceeds the allowable value set for the second measured value during the processing executed in the monitored object in accordance with the changed operation plan.

11. The monitoring apparatus according to claim 9, wherein the at least one processor is configured to execute the instructions to:
in a case where the operation plan is changed and processing for the monitored object is thereby added to the operation plan, predict the second measured value when the first measured value is changed based on the correlation model that corresponds to the added processing; and
determine whether or not the predicted second measured value exceeds the allowable value set for the second measured value during the processing added to the operation plan by changing the operation plan in the monitored object.

12. The monitoring apparatus according to claim 9, wherein the at least one processor is configured to execute the instructions to:
from among elements for the first measured value when the predicted second measured value exceeds the allowable value set for the second predicted value, specify the element based on preset properties of the elements.

13. A non-transitory computer-readable storage medium storing program for causing an information processing apparatus to execute processing to:
based on a correlation model that corresponds to processing executed in a monitored object in accordance with an operation plan in which an operation condition and an operation date/time of the operation condition are set and that represents a mutual relation between a first measured value and a second measured value measured from the monitored object, predict the second measured value when the first measured value is changed;

determine whether or not the predicted second measured value exceeds an allowable value set for the second measured value during the processing executed in the monitored object in accordance with the operation plan; and change the operation plan in which the operation condition and the operation date/time of the operation condition are set, in accordance with a result of determining whether or not the predicted second measured value exceeds the allowable value.

14. The non-transitory computer-readable storage medium in which a program is stored according to claim 13, wherein the program is for causing the information processing apparatus to further execute the processing to:
from among elements for the first measured value when the predicted second measured value exceeds the allowable value set for the second predicted value, specify the element based on preset properties of the elements.

* * * * *